United States Patent Office 2,890,934
Patented June 16, 1959

2,890,934
METHOD FOR MANUFACTURE OF PHOSPHATIC MATERIAL

Roger Bart, Lakeland, Fla., assignor to International Minerals & Chemical Corporation, a corporation of New York No Drawing. Application April 21, 1954
Serial No. 424,781

6 Claims. (Cl. 23—109)

This invention relates to a method of producing phosphate material for use as animal food supplement material as well as for fertilizers or plant foods. More particularly, it relates to a novel process for the production of a high grade phosphatic product. Still more particularly, it relates to a new and novel method for the recovery of dicalcium phosphate.

Various grades of so-called superphosphates are produced in commerce. A process in general use prepares high grade superphosphate by reacting ground phosphate rock with sulfuric acid. The product contains no more than about 20% by weight of available $P_2O_5$. Another process for the production of a high grade superphosphate is the acidification of ground phosphate rock with orthophosphoric acid. This produces a product ordinarily containing about 47% by weight of $P_2O_5$ of which about 90% is available and about 95% of the total available is water soluble. The disadvantage for fertilizer purposes of these products is that they are almost entirely and readily soluble. Quick solubility means availability at the time of application with little sustained or progressive $P_2O_5$ availability. Thus crops fail to have $P_2O_5$ available at the growing stage when they need it most.

The fluorine content of these superphosphates preclude their use as animal food supplement material. Further, the superphosphates show very low availability to an animal of the elemental phosphorus contained therein. As used here in reference to phosphate feed materials, availability means the extent with which phosphates are metabolized by animals as revealed by a biological measurement such as bone calcification and the like.

In an attempt to prepare phosphae materials of low fluorine content, the phosphate industry has resorted to calcination of superphosphates. If in addition to low fluorine a high $P_2O_5$ content is desired, the phosphate material has been prepared by extracting the water soluble constituents from superphosphates and precipitating mixtures of the various calcium phosphates. In this latter process, the chemical reaction for precipitation of dicalcium phosphate from a predominantly monocalcium phosphate extract solution is generally expressed as

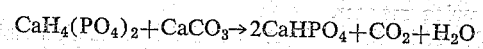

$$CaH_4(PO_4)_2 + CaCO_3 \rightarrow 2CaHPO_4 + CO_2 + H_2O$$

This reaction under normal conditions of reacting relatively pure materials is exothermic and causes some foaming due to the evolution of carbon dioxide gas. On the other hand, when attempting to precipitate dicalcium phosphate from extract solution, difficulty has been experienced with excessive and uncontrollable foaming occurring at unpredictable intervals. This problem has been hypothesized to be due to the presence of iron impurities. Regardless of the reason, it has been established in commercial operations that extract solutions produced by the leaching of superphosphates will react with calcium carbonate slowly for an initial period of unpredictable length and then erupt in an almost instantaneous reaction accompanied by violent foaming and a quick drop in pH of the solution. This reaction occurs even though a small quantity of calcium carbonate had been previously added to the extract solution to effect defluorination and to bring down a major portion of the impurities as a precipitate consisting of calcium fluoride, fluosilicates, aluminum phosphates, and iron phosphates, and this precipitate has been filtered out before the filtrate was subjected to the dicalcium phosphate precipitation reaction. The voilence of this reaction causes losses in $P_2O_5$ content giving lower process recoveries and requires interruption of continuous operation, thus causing increased operating costs.

It has now been discovered that in order to precipitate dicalcium phosphate from acidic phosphorus-bearing solutions containing iron in solution as an impurity, such as impure phosphoric acid or phosphate extract solutions prepared by leaching superphosphates, that reaction of calcium carbonate with the solution must be carried out in multiple stages with an insufficiency of calcium carbonate for complete reaction in the initial stages. In this method, fresh extract solution is mixed with less than the stoichiometric amount of calcium carbonate for reaction giving a mol ratio of $CaO/P_2O_5$ of 2 to 1 in an initial reaction stage, and the partially reacted slurry mixture is mixed as the reaction of the first added portion of $CaCO_3$ is nearing completion with the balance of the stoichiometric amount of calcium carbonate necessary for complete reaction. In this matter, the precipitation reaction is rendered continuous. In a continuous process of dicalcium phosphate precipitation, the acidic solution is mixed with the aliquot of calcium carbonate in the first of a series of mixing stages or reactors. Partially reacted material is discharged to a second reactor where the balance of the calcium carbonate is added and the resultant slurry either held in this stage or passed through one or more additional reaction stages for a time sufficient for complete reaction.

Extract solution, such as is treated in the instant process, is prepared by admixing phosphate rock with sulfuric acid to form an acid mix. A raw phosphatic rock material comprises essentially tricalcium phosphate or its equivalent. This phosphatic source material is best utilized if it is finely ground, i.e., about 48% to about 80% being capable of passing through a 200 mesh standard screen. Less finely ground material may be used, but the subsequent acidulation requires a considerably longer time to achieve substantial conversion. Generally, the finely ground material is allowed to react with sulfuric acid under constant and intensive agitation, which is of short duration.

The time of mixing is preferably of the order of one to two minutes, which time is sufficient for thorough mixing and at the same time results in the formation of a porous easily crushed mass of low bulk density. The temperature of the acid fed to the mixer is generally within the range of 65° C. to about 100° C.

The sulfuric acid mixed with finely ground rock may be of any convenient dilution; for example, about 50% to about 70% sulfuric acid corresponding to about 40° Bé. to about 55° Bé. It will, of course, be understood that under special conditions concentrations of sulfuric acid higher than mentioned can be utilized.

Acid is added to the ground phosphate rock in such proportions that there will be present in the mix between about 101% and about 115% of the sulfuric acid theoretically required to convert all of the $P_2O_5$ present in the rock to monocalcium phosphate, allowing in addition enough acid to also react with the impurities, such as iron, aluminum, fluorine, and the like. The total quantity of acid need not be added all at the same time, but may be partially added originally and the remainder added during or before the subsequent leaching step.

Acid mix sets up in about fifteen to twenty minutes into a dry mass which remains friable for indefinite periods of time. This acid mix, as initially formed, usually constitutes about 65% solids, but may range between about 45% and about 70% solids. The solidified mix may be conveyed directly to succeeding processing steps or it is simply stored until such time as required.

The acid mix is next subjected to a leaching and then a filtration operation. Acid mix brought from storage is usually passed through suitable pulverizing apparatus and the powdered product fed to a mixing tank in predetermined quantities where it is mixed with metered quantities of either water or dilute monocalcium phosphate aqueous solution. The leaching operation may be carried out at a temperature in the range of about 72° C. to about 82° C. in order to reduce the viscosity of the solution and improve filtration, provided the mol ratio of $CaO/P_2O_5$ is below 0.7, to prevent formation of insoluble dicalcium phosphate precipitates.

Leaching operations are preferably carried out by countercurrent flow of liquids and solids. Sufficient liquid leaching medium is added so that the resulting slurry contains between about 35% and about 40% solids, although more concentrated or more dilute slurries may be employed if desired. The agitation and slurrying is for a short period of the order of about five minutes to about fifteen minutes.

In the countercurrent operation water or dilute monocalcium phosphate solution first contacts solids which have passed through successive mixing stages and separations to the last mixing stage. After contact with water or the monocalcium phosphate dilute solution, the undissolved solids are separated and the separated material conveyed to waste or to storage. Rich liquor from the first filter stage contains approximately 30% to approximately 35% dissolved solids of which approximately 18% to approximately 24% is phosphate measured as $P_2O_5$ values. This solution is of approximately 31° Bé. to approximately 34° Bé. The separation of phosphatic solution and insoluble solids may be carried out in any convenient and conventional manner, such as, for example, by filtration, countercurrent multiple stage centrifuging, or by use of liquid phase cyclone separators.

Phosphate solution recovered from the extraction step is an aqueous solution of approximately 20% to approximately 35% by weight solids content. The phosphate solution comprises essentially monocalcium phosphate and orthophosphoric acid.

Extract solution is diluted to between about 10% and about 15% $P_2O_5$ and the diluted solution reacted with sufficient calcium carbonate; i.e., generally about five pounds to about eight pounds of calcium carbonate per 100 pounds of solution to precipitate iron and aluminum phosphates and calcium fluorides. After removal of the precipitated solids, resultant solution in general will analyze 11% to 14% $P_2O_5$, 0.10% to 0.20% $SO_4$, 0.02% to 0.04% fluorine, 3.0% to 4.5% CaO, 0.02% to 0.04% $Al_2O_3$ and 1.0% $Fe_2O_3$.

According to the instant invention, the resultant defluorinated extract solution is slurried with up to about 70% of the stoichiometric amount of calcium carbonate needed for precipitation of the $P_2O_5$ content as dicalcium phosphate. Generally, the amount added constitutes 15% to 45% of the stoichiometric amount. The slurry thus proportioned is continuously added to a mixing vessel where the slurry is agitated for a predetermined agitation time. From this mixing vessel there is continuously displaced an amount of substantially reacted slurry; i.e., the mixing tank capacity being such as to give a proper holding time for the feed rate of slurry being continuously introduced into the mixer. To this substantially reacted slurry is added sufficient additional calcium carbonate to complete the precipitation of dicalcium phosphate.

This precipitation reaction may be carried out at temperatures ranging from 100° F. to 212° F., but it is preferred that the reaction be at a temperature in the range between about 190° F. and about 210° F. in order to obtain as complete precipitation as possible.

The invention will be further understood from the following example which is given by way of illustration and without any intention of having the invention limited thereto.

*Example*

About 60 tons per hour Florida phosphate rock was ground to a particle size, approximately 52% of which passes through a 200 mesh standard screen. This rock analyzed about 68% bone phosphate of lime. The ground rock was mixed with about 36 tons per hour of about 98% sulfuric acid added as approximately 53° Bé. aqueous solution. The mixture was thoroughly agitated for about one minute, after which it was discharged onto a continuous belt provided with exhaust means for gases such as sulfur dioxide, silicon tetrafluoride, and the like, adjacent the point of discharge of slurry onto the belt. The belt length and its speed were such that the mix remained on the belt approximately twenty minutes. The discharge from the belt was stored in a pile for about thirty days.

The stored material was then removed from storage, broken up, and sufficient water added to give a slurry of about 35% undissolved solids. The slurry was subjected to four stages of continuous countercurrent mixing and filtering, the final filtrate being a leached solution containing about 30% dissolved solids and being of approximately 32° Bé. gravity. The discarded tailings contain about 2½% of the 30% total $P_2O_5$ in the original rock. The filtrate from the leaching operation was further processed by adding approximately 4.7 tons per hour of limestone or its equivalent in calcium hydroxide added in the form of hydrated lime or other suitable calcium oxide source material. After slurrying for approximately thirty minutes, the slurry was filtered on a drum filter to remove precipitated materials such as calcium fluoride, aluminum phosphate, iron phosphate, and the like.

The filtrate from the slurrying or defluorinating step analyzed as follows:

| | Tons per hour |
|---|---|
| $P_2O_5$ | 15.2 |
| Fluorine | 0.033 |
| Sulfate ($SO_4$) | 0.16 |
| Calcium oxide (CaO) | 5.18 |
| $Al_2O_3$ | 0.03 |
| $Fe_2O_3$ | 0.015 |

The solution totaled 136½ tons per hour by weight.

To the defluorinated liquor was added 14.1 tons per hour of calcium carbonate; i.e., Ocala limestone, in the following manner.

The defluorinated liquor was fed to a reaction tank No. 1. Ground calcium carbonate was mixed with recycled liquor from the bottom of reaction tank No. 2 in a slurrying tank. Slurry from this tank was proportioned such that approximately 4.2 tons per hour of calcium carbonate was delivered to reaction tank No. 1. Partially reacted slurry from reaction tank No. 1 overflowed into reaction tank No. 2. Limestone slurry was delivered from the slurrying tank to reaction tank No. 2 at the rate giving 9.9 tons per hour of delivered calcium carbonate. Slurry from reaction tank No. 2 overflowed to reaction tank No. 3 and reaction tank No. 3 overflowed to a fourth reaction tank needed to give a holding time for the total reaction of approximately one hour. Slurry delivered from reaction tank No. 4 had a temperature of approximately 180° F. The slurry was filtered on drum filters, and a cake recovered which in wet form analyzed as follows:

| | Tons per hour |
|---|---|
| $P_2O_5$ | 14.9 |
| F | 0.037 |
| $SO_4$ | 0.14 |
| CaO | 12.69 |
| $Al_2O_3$ | 0.03 |
| $Fe_2O_3$ | 0.01 |
| $CO_2$ | 0.68 |

This cake totaled in weight approximately 50.8 tons per hour. The solids were dried at a temperature to approximately 230° F. to give a product analyzing approximately 20% elemental phosphorus. Aqueous medium recovered from the filter analyzing

| | Tons per hour |
|---|---|
| $P_2O_5$ | 0.30 |
| $SO_4$ | 0.02 |
| CaO | 0.25 | was returned to the process at various stages as process water. The solution totaled approximately 94½ tons per hour.

Having thus described and illustrated the character of the instant invention, what is desired to be secured and claimed by Letters Patent is:

1. A method of continuously precipitating dicalcium phosphate from acidic phosphorus-bearing solutions containing iron in solution as an impurity which comprises reacting said solution in a plurality of stages with calcium carbonate, adding from about 15% up to about 70% by weight of the stoichiometric amount of calcium carbonate required for dicalcium phosphate precipitation into the first reaction stage, allowing time for substantial, but incomplete reaction of the first added amount of calcium carbonate, discharging the partially reacted slurry mixture from the first reaction stage and adding to the paritally reacted slurry mixture the balance of the calcium carbonate required for completion of the dicalcium phosphate precipitation reaction in a subsequent reaction stage prior to completion of the reaction with the first added quantity of calcium carbonate.

2. A method of continuously precipitating dicalcium phosphate from acidic phosphorus-bearing solutions containing iron in solution as an impurity and produced by the reaction of phosphate rock and sulfuric acid, water leaching the same and recovering acidic solids-free solution which comprises reacting said solution in a plurality of stages with calcium carbonate, adding from about 15% to about 70% by weight of the stoichiometric amount of calcium carbonate required for dicalcium phosphate precipitation into the first reaction stage, allowing time for substantial but incomplete reaction of the first quantity of calcium carbonate, discharging the partially reacted slurry mixture from the first reaction stage and completing the precipitation of phosphates in the form of dicalcium phosphate in a series of reaction stages, the balance of the calcium carbonate required for precipitation being added to the partially reacted slurry mixture prior to completion of the reaction between the solution and the first added quantity of calcium carbonate.

3. A method of continuously precipitating dicalcium phosphate from acidic phosphorus-bearing solutions containing iron in solution as an impurity and produced by the reaction of phosphate rock and sulfuric acid, water leaching the same and recovering acidic solids-free solution which comprises reacting said solution in a plurality of stages with calcium carbonate, adding from about 15% to about 45% by weight of the stoichiometric amount of calcium carbonate required for dicalcium phosphate precipitation into the first reaction stage, allowing time for substantial but incomplete reaction of the first quantity of calcium carbonate, discharginge the partially reacted slurry mixture from the first reaction stage and completing the precipitation of phosphates in the form of dicalcium phosphate in a series of reaction stages, the balance of the calcium carbonate required for precipitation being added to the partially reacted slurry mixture prior to completion of the reaction between the solution and the first added quantity of calcium carbonate.

4. A method of continuously precipitating dicalcium phosphate from acidic phosphorus-bearing solutions containing iron in solution as an impurity and produced by the reaction of phosphate rock with sulfuric acid, water leaching the same and recovering acidic solids-free solution, which comprises reacting said solution at a temperature in the range of about 100° F. to about 212° F. with calcium carbonate in a plurality of stages in series, adding from about 15% up to about 70% by weight of the stoichiometric amount of calcium carbonate required for dicalcium phosphate precipitation into the first reaction stage, allowing time for substantially but incomplete reaction of the first added quantity of calcium carbonate, discharging the partially reacted slurry mixture from the first reaction stage to the subsequent series of reaction stages, adding to the partially reacted slurry mixture the balance of the calcium carbonate required to complete precipitation of the phosphates in the form of dicalcium phosphate into the second reaction stage.

5. A method of continuously precipitating dicalcium phosphate from acidic phosphorus-bearing solutions containing iron in solution as an impurity and produced by the reaction of phosphate rock with sulfuric acid, water leaching the same and recovering acidic solids-free solution, which comprises reacting said solution at a temperature in the range of about 180° F. to about 210° F. with calcium carbonate in a plurality of stages in series, adding from about 15% up to about 70% by weight of the stoichiometric amount of calcium carbonate required for dicalcium phosphate precipitation into the first reaction stage, allowing time for substantially but incomplete reaction of the first added quantity of calcium carbonate, discharging the partially reacted slurry mixture from the first reaction stage to the subsequent series of reaction stages, adding to the partially reacted slurry mixture the balance of the calcium carbonate required to complete precipitation of the phosphates in the form of dicalcium phosphate into the second reaction stage, and filtering the resultant slurry to recover the dicalcium phosphate precipitated as solid material.

6. The method of continuously precipitating dicalcium phosphate which comprises reacting comminuted Florida phosphate rock of a particle size approximately 52% of which passes through a 200 mesh standard screen with sulfuric acid of approximately 53° Bé., aging the acid rock mix, countercurrently leaching the soluble constituents from the acid rock mix with aqueous medium to produce a leached solution of approximately 32° Bé. gravity, filtering the slurry to recover a solids-free filtrate, treating the filtrate with approximately 4.7 tons per hour of calcium carbonate to defluorinate the solution, filtering the resultant slurry to recover a defluorinated filtrate, reacting the defluorinated filtrate with approximately 4.2 tons per hour of calcium carbonate in a dicalcium phosphate precipitation stage, overflowing the partially reacted slurry from the first to a second dicalcium phosphate precipitation stage, adding to the partially reacted slurry mixture approximately 8.9 tons per hour of calcium carbonate into the second dicalcium phosphate precipitation stage, passing the slurry from the second precipitation stage through subsequent stages of a capacity to give a total reaction time of approximately one hour, filtering the resultant slurry to recover the dicalcium phosphate precipitated solid material, and drying said solids at a temperature of approximately 250° F. to produce a product analyzing approximately 20% elemental phosphorus.

(References on following page)

References Cited in the file of this patent

UNITED STATES PATENTS

| | | |
|---|---|---|
| 1,849,704 | Boller | Mar. 15, 1932 |
| 2,013,970 | Moore | Sept. 10, 1935 |
| 2,043,238 | Curtis | June 9, 1936 |
| 2,078,627 | Block et al. | Apr. 27, 1937 |
| 2,108,940 | MacIntire | Feb. 22, 1938 |
| 2,115,150 | Seyfried | Apr. 26, 1938 |
| 2,164,627 | Seyfried | July 4, 1939 |
| 2,312,047 | Ogburn | Feb. 23, 1943 |
| 2,728,635 | Miller | Dec. 27, 1955 |
| 2,767,045 | McCullough | Oct. 16, 1956 |

UNITED STATES PATENT OFFICE

CERTIFICATE OF CORRECTION

Patent No. 2,890,934                                                            June 16, 1959

Roger Bart

It is hereby certified that error appears in the printed specification of the above numbered patent requiring correction and that the said Letters Patent should read as corrected below.

Column 1, line 46, for "phosphae" read -- phosphate --; column 2, line 10, for "voilence" read -- violence --; column 4, line 7, for "190° F." read -- 180° F. --; column 5, line 75, for "discharginge" read -- discharging --; column 6, lines 19 and 38, for "substantially", each occurrence, read -- substantial --.

Signed and sealed this 23rd day of February 1960.

(SEAL)
Attest:

KARL H. AXLINE                                              ROBERT C. WATSON
Attesting Officer                                          Commissioner of Patents